(12) United States Patent
Stonehouse (10) Patent No.: US 6,209,834 B1
(45) Date of Patent: Apr. 3, 2001

(54) OPTICAL IMAGING MOUNT APPARATUS

(75) Inventor: David Stonehouse, Fairmont Hot Springs (CA)

(73) Assignee: Verimap Plus Inc., Calgary (CA)

( * ) Notice: Subject to any disclaimer, the term of this patent is extended or adjusted under 35 U.S.C. 154(b) by 0 days.

(21) Appl. No.: 09/310,121

(22) Filed: May 12, 1999

(30) Foreign Application Priority Data

Apr. 12, 1999 (CA) .................................................. 2268681

(51) Int. Cl.[7] .................................................. G03B 17/56
(52) U.S. Cl. ..................... 248/274.1; 396/12; 396/428
(58) Field of Search .......................... 248/274.1, 179.1, 248/184.1, 187.1, 286.1, 183.1, 278.1; 396/7, 12, 13, 419, 427, 428

(56) References Cited

U.S. PATENT DOCUMENTS

| | | | |
|---|---|---|---|
| D. 398,319 | * 9/1998 | Chen | 396/427 |
| 1,151,549 | * 8/1915 | Schade | 248/187.1 |
| 1,797,893 | * 3/1931 | Zerk | 248/187.1 |
| 1,863,891 | * 6/1932 | Zuber | 396/419 |
| 2,145,584 | * 1/1939 | Chamberlain, Jr. | 248/179.1 |
| 2,459,676 | * 1/1949 | Axtell | 248/183.1 |
| 2,460,568 | * 2/1949 | Buehner | 248/183.1 |
| 2,726,834 | * 12/1955 | Hoge | 396/428 |
| 2,916,243 | * 12/1959 | Johnston | 248/231.41 |
| 3,782,671 | * 1/1974 | Igwe | 248/187.1 |
| 4,018,412 | * 4/1977 | Kees, Jr. et al. | 248/286.1 |
| 4,110,913 | * 9/1978 | Dick | 33/336 |
| 4,234,149 | * 11/1980 | Kawazoe | 248/184.1 |
| 4,316,592 | * 2/1982 | Jett | 248/187.1 |
| 4,466,595 | * 8/1984 | O'Connor | 248/187.1 |
| 4,752,791 | * 6/1988 | Allred | 396/13 |
| 4,933,691 | * 6/1990 | Leslie | 396/427 |
| 4,979,709 | * 12/1990 | Ishikawa | 248/18.1 |
| 5,223,872 | * 6/1993 | Stiepel et al. | 396/427 |
| 5,397,086 | * 3/1995 | Chen | 396/428 |
| 5,426,476 | * 6/1995 | Fussell et al. | 396/12 |
| 5,568,189 | * 10/1996 | Kneller | 396/12 |
| 5,931,102 | * 8/1999 | Grahl | 248/278.1 |
| 6,027,085 | * 2/2000 | Ruther | 248/187.1 |

FOREIGN PATENT DOCUMENTS

| | | | |
|---|---|---|---|
| 233213 | * 10/1944 | (CH) | 248/183.1 |
| 7841 | * 11/1879 | (DE) | 248/187.1 |
| 354541 | * 6/1922 | (DE) | 248/179.1 |
| 405150351 | * 6/1993 | (JP) | 248/187.1 |

* cited by examiner

Primary Examiner—Ramon O. Ramirez
Assistant Examiner—Jon A Szumny
(74) Attorney, Agent, or Firm—Blake, Cassels & Graydon LLP; Terry L. Leier (57) ABSTRACT

Optical image sensor mounting apparatus to mount an image sensor to a mount structure includes a frame with a pivot coupling and X-Y translation apparatus interconnecting the frame to the mount structure. The pivot coupling is operable to set the angular displacement between the frame and the mount structure and the X-Y translation apparatus is operable to set the translational displacement between the frame and the mount structure. A rotational coupling interconnecting the frame to the mount structure can also be provide, the rotational coupling operable to set the rotational displacement between the frame and the mount structure.

24 Claims, 7 Drawing Sheets

OPTICAL IMAGING MOUNT APPARATUS

FIELD OF THE INVENTION

The present invention relates to optical imaging mounting equipment adapted for use with aerial imaging and photo equipment.

BACKGROUND OF THE INVENTION

One way of producing maps for survey use relies on conducting aerial surveys of the geographic region to be surveyed. It is known that aerial survey photographs are subject to distortions and errors in relation to the geographic area surveyed. The photos obtained during the aerial survey can be used to produce maps, however, the photographic images must be processed to rectify or correct the distortions and errors of the photos by a manual process. This process is referred to as photo rectification. Generally survey photo rectification using manual methods is labour intensive and, therefore, very expensive. Moreover, photo rectification processing of the aerial photos requires a considerable period of time before accurate maps can be produced from the aerial survey photos.

There are various methods which have been introduced to improve the timeliness of photo rectification from which an accurate survey map result can be produced from the aerial photographs. In one manner of aerial photography, a traditional ground survey crew is deployed in the geographic region to be surveyed. The crew surveys selected portions of the geographic region using standard survey equipment such as global positioning sensors (GPS) and survey equipment including transits and lasers to lay actual "photo targets" on the ground. The photo targets provide "known" points on the geographic region that is to be mapped. The photo targets provide a basis for correction of the aerial photoimagery obtained by aerial surveys to permit the end product to be produced, for example, a scaled image map with contour lines and a latitude-longitude grid. Naturally, the more photo targets that are deployed by the ground crew, the more accurate will be the final map survey product produced from the aerial photos.

In another manner of aerial photography, an aerial reconnaissance vehicle or aeroplane can be equipped with a scanning laser to obtain X, Y, Z elevation data points. If the X, Y, Z elevation data points can be related to the geographic region of interest, a survey map comprising a uniform grid for which such X, Y, Z elevation data points define the topography of the geographic region which is surveyed can be produced. Where a scanning laser aerial reconnaissance is used, it is necessary that the optical sensor which captures the laser illumination on the terrain be accurately calibrated and oriented. The optical sensor must be calibrated and oriented in relation to the laser source, as well as in relation to the aerial vehicle which is used to transport the optical sensor and illumination source, such as a laser source, over the terrain to be surveyed.

SUMMARY OF THE INVENTION

The present invention provides an optical sensor mount for use with an aerial reconnaissance vehicle.

In one of its broad aspects, the invention provides optical image sensor mounting apparatus to mount an image sensor to a mount structure comprising a frame to releasably retain an optical image sensor; mount means for connection to a mount structure; at least one pivot coupling interconnected with said frame and said mount means operable to set the angular displacement between said frame and said mount means and X-Y translation apparatus interconnected with said frame and said mount means operable to set the translational displacement between said frame and said mount means.

In one of its aspects, the invention provides, optical image sensor mounting apparatus to mount an image sensor to a mount structure comprising a frame to releasably retain an optical image sensor; mount means for connection to a mount structure; at least one pivot coupling interconnected with said frame and said mount means operable to set the angular displacement between said frame and said mount means; at least one rotational coupling interconnected with said frame and said mount means operable to set the rotational displacement between said frame and said mount means; and X-Y translation apparatus interconnected with said frame and said mount means operable to set the translational displacement between said frame and said mount means.

The preferred embodiments of the invention will now be described with reference to the drawings, in which:

DETAILED DESCRIPTION OF THE PREFERRED EMBODIMENTS

Figure 1:
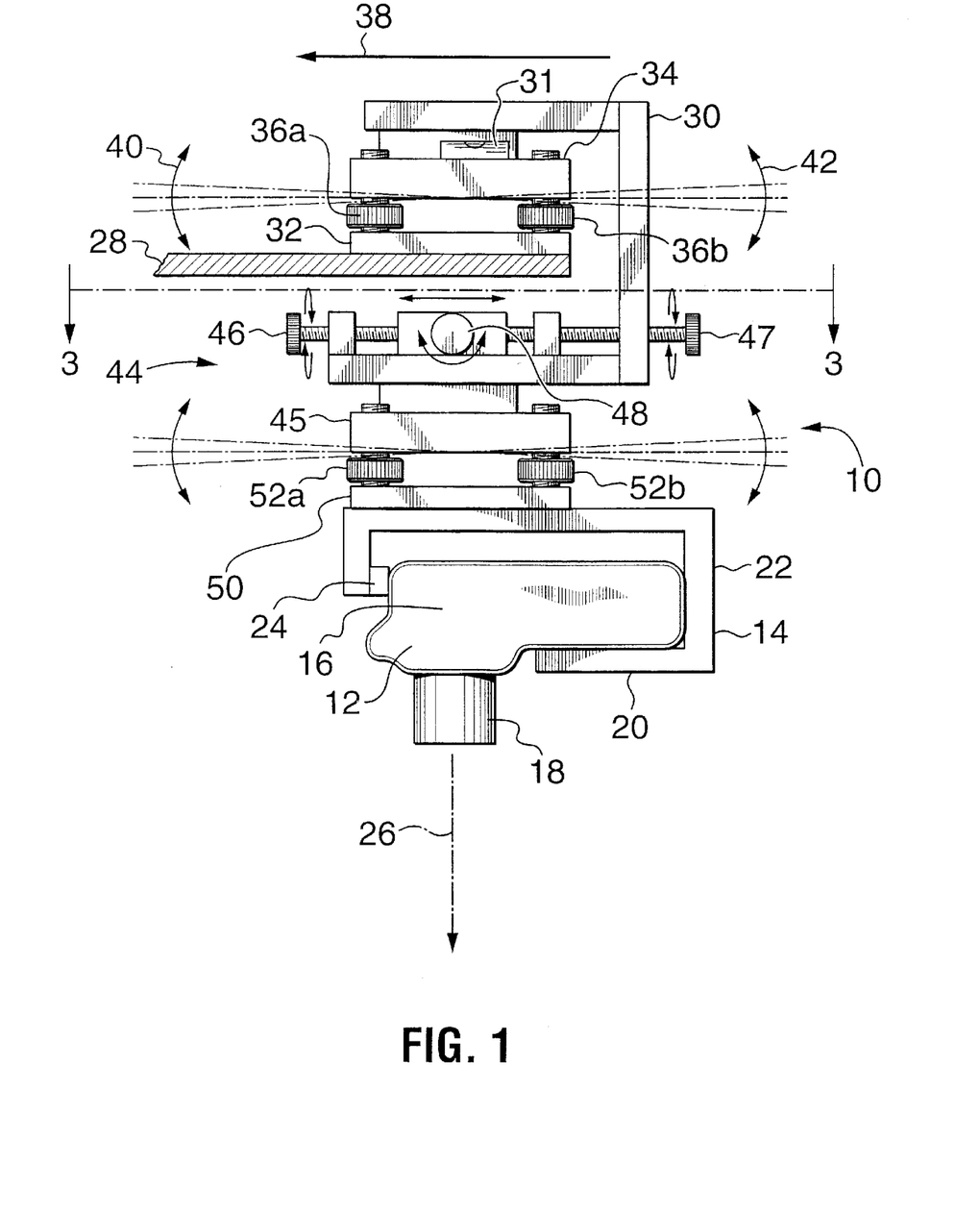
FIG. 1 is a side elevation view of an optical imaging sensor mount apparatus in accordance with the present invention.

FIG. 1 shows a side elevation view of an optical imaging sensor mount apparatus, generally depicted by reference number 10. An optical imaging sensor 12, such as a camera, is engaged by a holding frame 14 which engages the camera body 16 to orient the camera lens 18 outwardly from the camera mount apparatus 10. The camera holding frame 14 includes a securing means to retain the camera 12 within the frame 14. The securing means including, for example, a lower plate 20 which provides a surface upon which optical image sensor or camera 12 can rest. Co-operation between frame end plate 22 and releasable securing means 24 operate to retain optical imaging sensor or camera 12 securely within the camera holding frame 14 while permitting the camera to be removed when necessary for inspection or replacement. Camera 12 has an optical image axis 26 which, passes through the central point, or picture element, or pixel of the optical image captured by camera 12 as will be described in more detail with reference to FIGS. 7 and 8.

The optical image sensor or camera mount apparatus 10 has a structure coupling 32 to couple to a mount structure 28, such as a plate or a frame. An intermediate member 30 is pivotally connected to structure coupling 32 by means of a first pivot coupling generally depicted at reference numeral 34. In a preferred embodiment, one end of first pivot coupling 34 forms structure coupling 32 which is attached to mounting structure 28. The pivot portion of first pivot coupling 34 includes at least three threaded thumb screws 36 (36a, and 36b being shown in FIG. 1). The other end of first pivot coupling 34 is connected to intermediate member 30. Rotation of threaded thumb screws 36 cause intermediate member 30 to pivot or undergo angular displacement with respect to mount structure 28 thereby to control the angular orientation of intermediate member 30 with respect to mount structure 28 by engagement of thumb screws 36 with first pivot coupling 34. For example, the threaded protrusions of thumb screws 36a and 36b shown extending through first pivot coupling 34 above thumb screws 36a and 36b in FIG. 1 and 36c in FIG. 2. Where the camera mount apparatus 10 is mounted in an aircraft travelling in a direction of flight as depicted by vector arrow 38, then adjustment of threaded thumb screws 36 can be used to control the pitch angle and the roll angle of the intermediate member 30 with respect to mount structure 28 and, therefore, also with respect to the direction of flight of vector arrow 38. The adjustment of the pitch angle is generally depicted by double headed arrows 40 and 42. The adjustment of the orthogonal roll angle is also controlled by first pivot coupling 34 as shown by double headed arrows 54 of FIG. 2. The first pivot coupling 34 controls the horizontal orientation of the intermediate member 30 to ensure that intermediate member 30 is oriented such that the X-Y translation apparatus 44 is positioned in a horizontal plane. To assist in achieving a level orientation of intermediate member 30, a level indicate 31, such as a bubble level, may be provided.

X-Y translation apparatus 44 includes a translation coupling 45 which may be urged laterally in a first direction, which can be identified as the "Y" direction. Lateral translation of translation coupling 45 is accomplished by co-operative rotation of thumb screws 46 and 47 as explained in more detail with reference to FIG. 3. A second, orthogonally oriented, thumb screw pair 48 and 49 is also provided. Thumb screws 48 and 49 can be co-operatively rotated to displace the X-Y translation apparatus in an orthogonal direction to the "Y" direction. The orthogonal direction obtained by second thumbscrews 48 and 49 can be identified as the "X" direction. X-Y translation apparatus 44 is provided to displace translation coupling 45 with respect to mount structure 28 in the X direction or the Y direction within the limits imposed by the physical structure of the X-Y translation apparatus 44. As will be understood, the first pivot coupling 34 is adjusted to obtain a true horizontal level plane of X-Y translation apparatus 44 whereby translation of translation coupling 45 in the X or Y direction does not at the same time cause the translation coupling 45 to be displaced vertically.

In one embodiment, translation coupling 45 is pivotally coupled to optical image sensor camera holding frame 14 thereby allowing pivot coupling 34 and translation coupling 45 to control the orientation of camera holding frame 14. While such a configuration is workable, it is not the preferred embodiment. In the preferred embodiment, translation coupling 45 is pivotally coupled to optical image sensor or camera holding frame 14 via a second pivot coupling 50.

Second pivot coupling 50 has at least three threaded thumb screws 52 (with thumb screws 52a and 52b shown in this figure) to allow the camera holding frame 14 to be pivotally adjusted to ensure that optical image axis 26 is oriented in a true vertical line with respect to mount structure 28 or with respect to direction of flight vector arrow 38.

Figure 2:
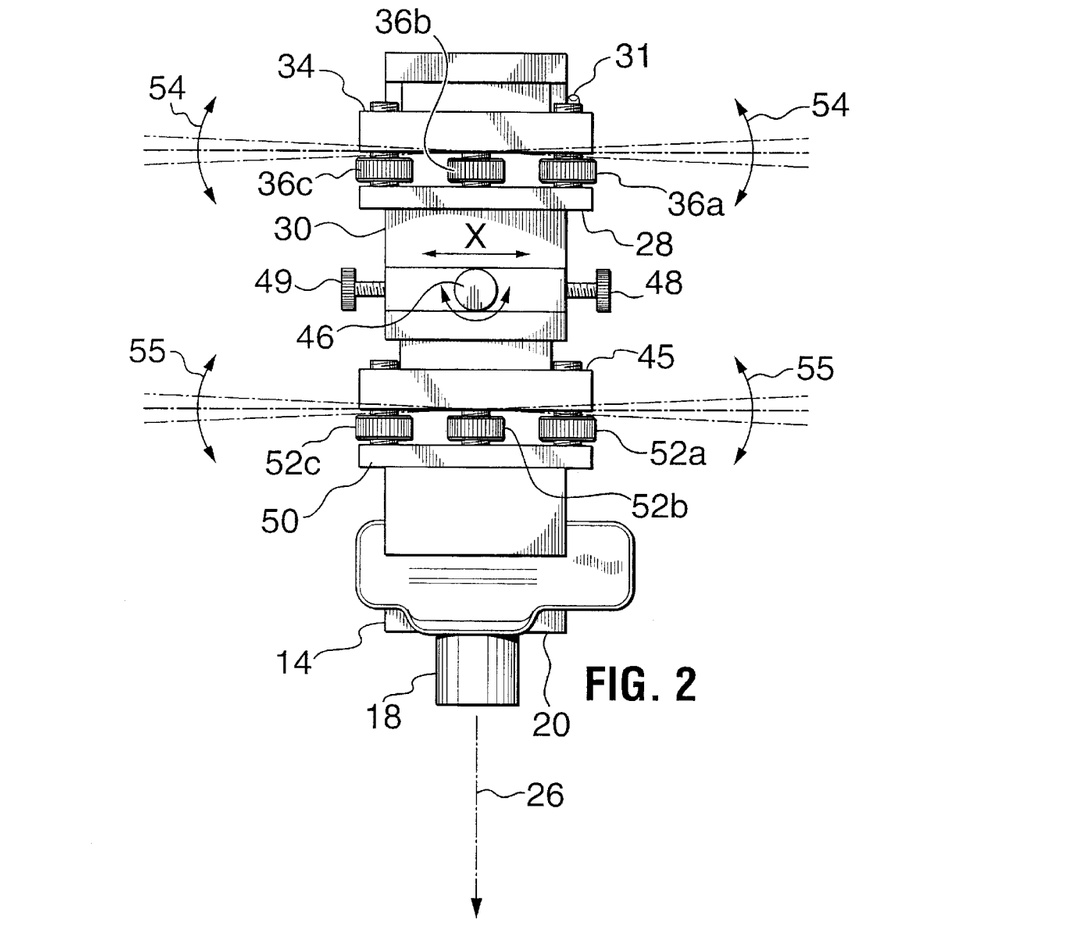
FIG. 2 is a front elevation view of the optical image sensor mount apparatus of FIG. 1.

FIG. 2 is a front elevation view of the apparatus of FIG. 1. Like reference numerals have been used throughout the Figures to depict the same features of the invention. In FIG. 2, the three thumb screws 36a, 36b and 36c of the first pivot coupling 34 are visible. Adjustment of the thumb screws 36 allows the angular orientation of intermediate member 30 relative to mount structure 28 to be adjusted. In the view of FIG. 2, the roll angle orientation is controlled as shown by double headed arrows 54.

The X-Y displacement apparatus thumb screws 48 and 49 are co-operatively rotated to displace translation coupling 45 in the "X" direction depicted by the horizontal double headed arrow labelled "X". In the preferred embodiment, interposed between optical sensor camera holding frame 14 and translation coupling 45 is second pivot coupling 50. Second pivot coupling 50 includes at least 3 threaded thumb screws 52a, 52b and 52c that are co-operatively rotated to adjust the angular orientation of camera holding frame 14 relative to translation coupling 45. In the plane of view of FIG. 2, the angular orientation of camera holding frame 14 relative to translation coupling 45 is the roll angle component of the angular orientation as depicted by double headed arrows 55.

Figure 3:
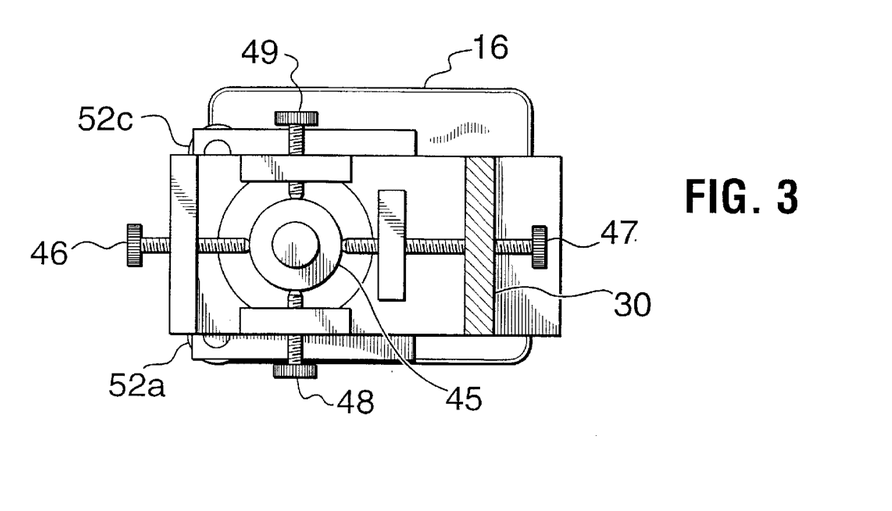
FIG. 3 is a top elevation view of the optical image sensor mount apparatus of FIG. 1.

FIG. 3 is a top view of the camera mount taken along cutting line 3—3 of FIG. 1. FIG. 3 depicts details of the X-Y translation apparatus 44 which includes opposed thumb screws 46 and 47. Thumbscrews 46 and 47 are co-operatively rotated to translate translation coupling 45 in a first direction, which is referred to as the Y direction. Oriented orthogonal to the direction defined by thumb screws 46 and 47 are opposed thumb screws 48 and 49 which can be co-operatively rotated to move translation coupling 45 in an orthogonal direction, which is referred to as the X direction.

Figure 4:
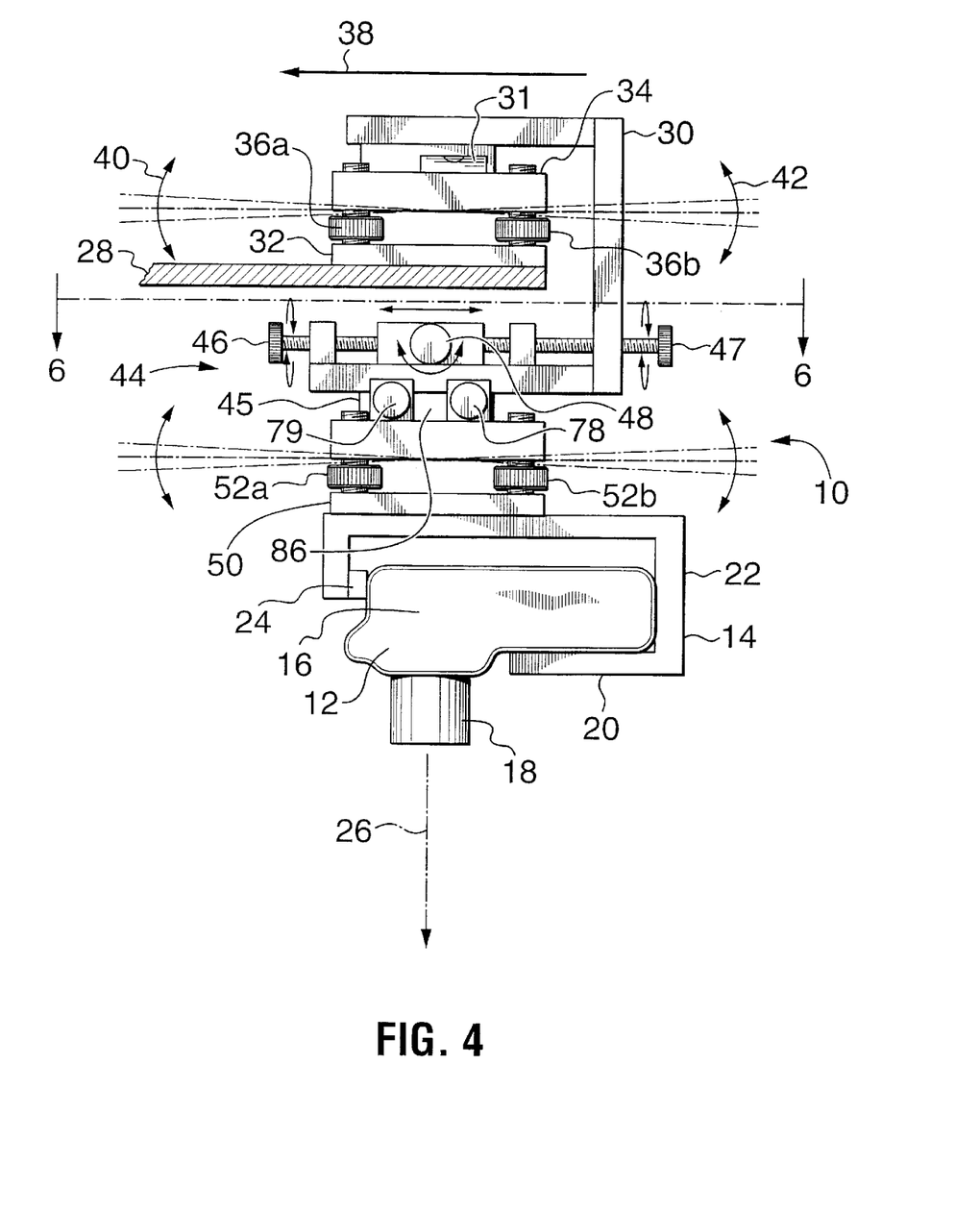
FIG. 4 is a side elevation view of an alternate embodiment of the optical imaging sensor mount apparatus of FIG. 1 including a rotational coupling.

FIG. 4 shows an alternate embodiment of the mount 10 of FIG. 1 further including a rotational coupling to control the rotational displacement of camera mount apparatus 10 with respect to mount structure 28. In this embodiment, translation coupling 45 is constructed to be rotatable with respect to intermediate member 30. Thumbscrews 78 and 79 provide the control adjustment to control the rotational displacement of translation coupling 45 which in turn controls the rotational displacement of camera mount apparatus 10 with respect to mount structure 28. Rotational adjustment of the camera mount apparatus 10 with respect to mount structure 28 causes the image produced by optical image sensor 12 to rotate about optical image axis 26. The rotational adjustment allows control of the orientation of the image produced by optical image sensor 12 with respect to the direction of flight vector 38. The rotational orientation of the image produced by optical image sensor 12 with respect to the direction of flight vector 38, is referred to as the yaw angle. In the preferred embodiment, translation coupling 45 defines two opposed substantially planar parallel surfaces, of which surface 86 is visible in FIG. 4. Thumbscrews 78 and 79 threadingly engage intermediate member 30 at one end thereof and are spacedly disposed from each other. Translation coupling 45 is rotatable with respect to intermediate member 30, accordingly, turning thumbscrews 78 and 79 causes each to bear upon or release one end of the planar surface 86 defined by translation coupling 45, which co-operatively acting with opposing thumbscrews 77 and 80 (see FIG. 6) operating on opposed planar surface 84, operate to control the rotation angle between translation coupling 45 and intermediate member 30.

Figure 5:
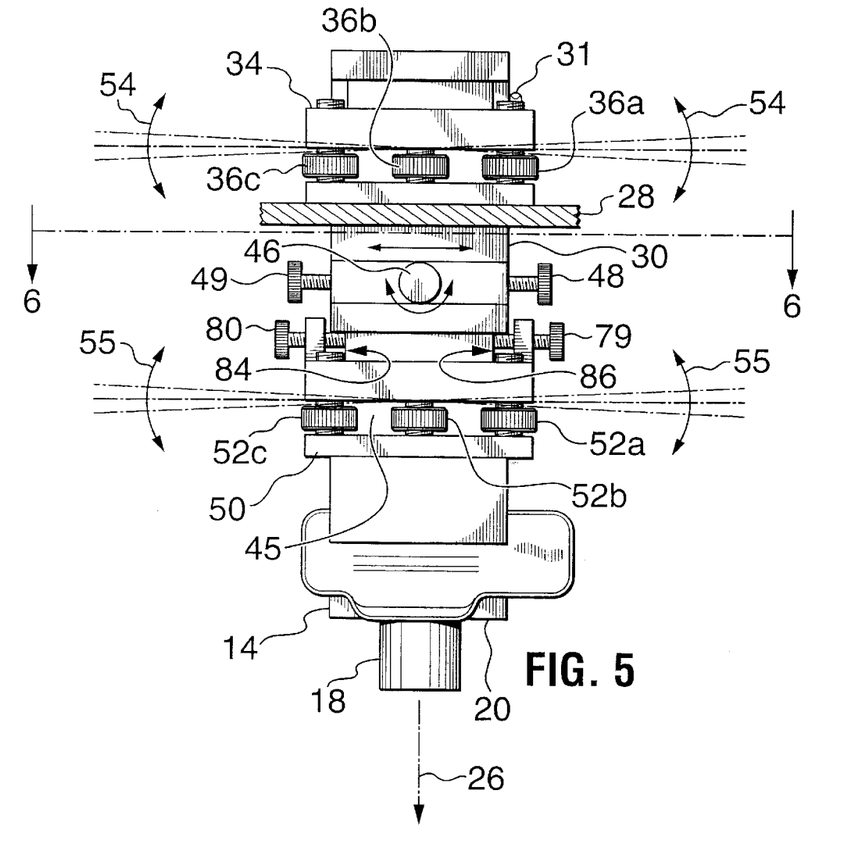
FIG. 5 is a front elevation view of the optical image sensor mount apparatus of FIG. 4.

FIG. 5 is a front elevation view of the apparatus of FIG. 3. Thumbscrews 79 and 80 are visible in the plane of view of FIG. 5 and are used to control the rotational displacement or yaw angle between vector 38 and image optical axis 26. Also visible in this view is an edge of second opposed planar surface 84 which is provided to control rotational displacement as just described with reference to surface 86.

Figure 6:
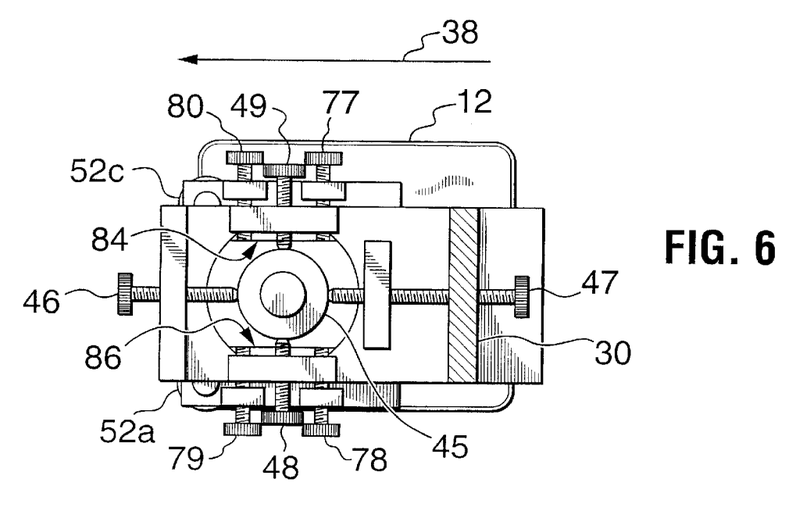
FIG. 6 is a top elevation view of the optical image sensor mount apparatus of FIG. 4.

FIG. 6 shows a top plan view taken along cutting line 6—6 of FIGS. 4, 5, 7 and 8. In FIG. 6, details of the rotational displacement or yaw angle adjustment apparatus is provided. Opposed paired thumbscrews 77, 78, 79 and 80 releasably bear upon planar surfaces 84 and 86 to provide an adjustment to control the rotational displacement of optical image sensor 12 with respect to intermediate member 30 thereby controlling the image orientation of the image produce by image sensor 12 with respect to the direction of flight vector 38. Rotation adjustment of the camera mount apparatus 10 with respect to mount structure 28 causes the image produced by optical image sensor 12 to rotate about optical image axis 26. The adjustment angle affected by the rotational displacement is referred to as the yaw angle. The thumbscrews are paired in operation with thumbscrew 77 paired with 79 and thumbscrew 78 paired with 80. Stated another way, tightening thumbscrews 77 and 79 causes translation coupling 45 to rotate with respect to intermediate member 30 to effect adjustment of the yaw angle in one direction. Similarly, tightening thumbscrews 78 and 80 causes translation coupling 45 to rotate in the opposite direction with respect to intermediate member 30 to effect adjustment of the yaw angle in the other direction. The paired thumbscrews are rotated in unison with each other and in the opposite direction to the other paired thumbscrews. That is, tightening one pair of thumbscrews requires the other pair to be loosened to effect adjustment of the rotation angle.

Figure 7:
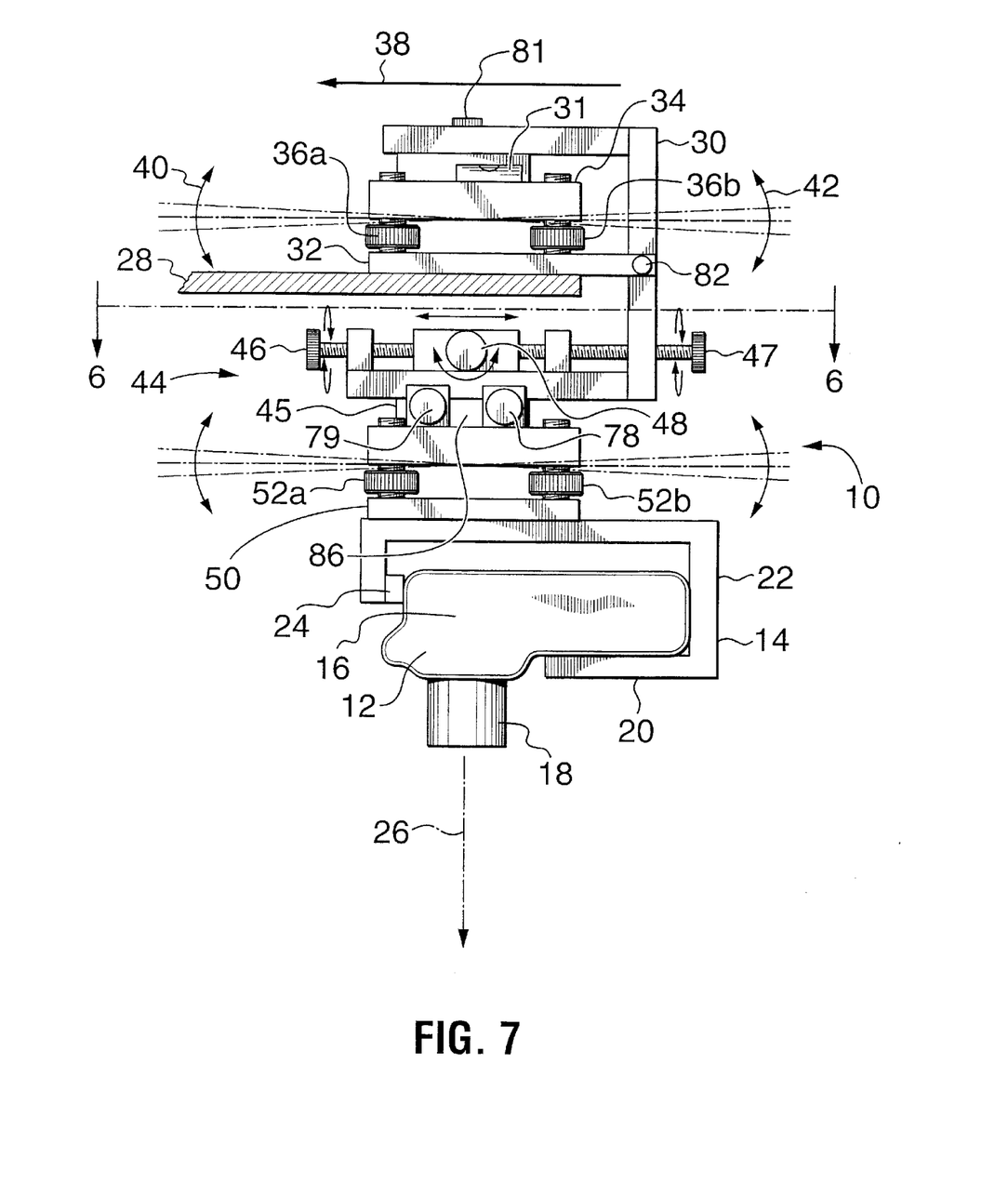
FIG. 7 is a side elevation view of an alternate embodiment of the optical imaging sensor mount apparatus of FIG. 4.

FIG. 7 is a side elevation view of an alternate embodiment of the optical imaging sensor mount apparatus of FIG. 4 including a rotational coupling 81 interconnecting first pivot coupling 34 to intermediate member 30 allowing rotation between the two elements. In this embodiment, alternate additional means are provided to control the yaw angle of the optical image axis 26 with respect to the direction of flight vector 38 including thumbscrew 82.

Figure 8:
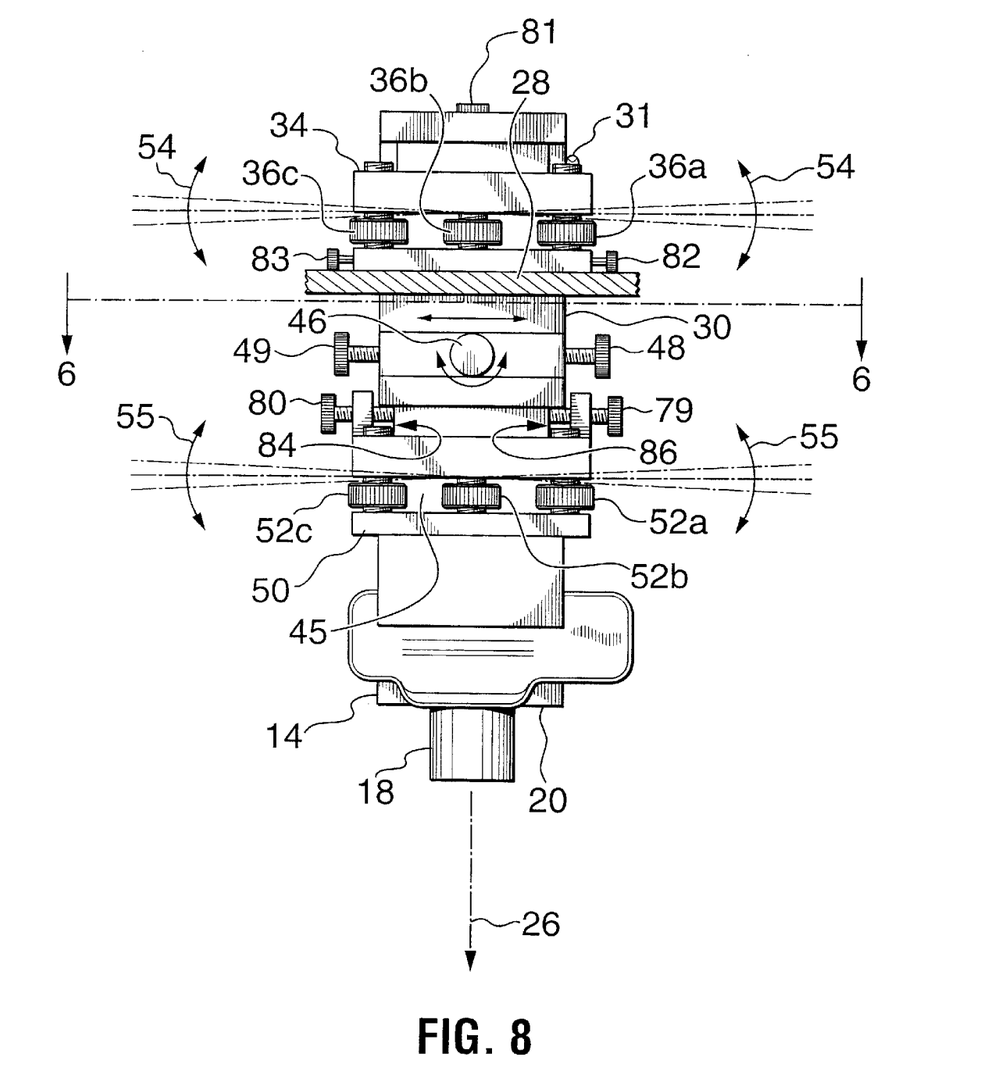
FIG. 8 is a front elevation view of the optical image sensor mount apparatus of FIG. 7.

As seen most clearly in FIG. 8, an alternate embodiment of a rotational coupling to control of the angle of rotation or yaw angle between optical image axis 26 and the direction of flight vector 38, is provided by thumbscrew 82 working in co-operation with opposed thumbscrew 81. In this embodiment, opposed thumbscrews 82 and 83 co-operate to control the rotational displacement of intermediate member 30 with respect to mount structure 28 about rotation coupling 81.

Figure 9:
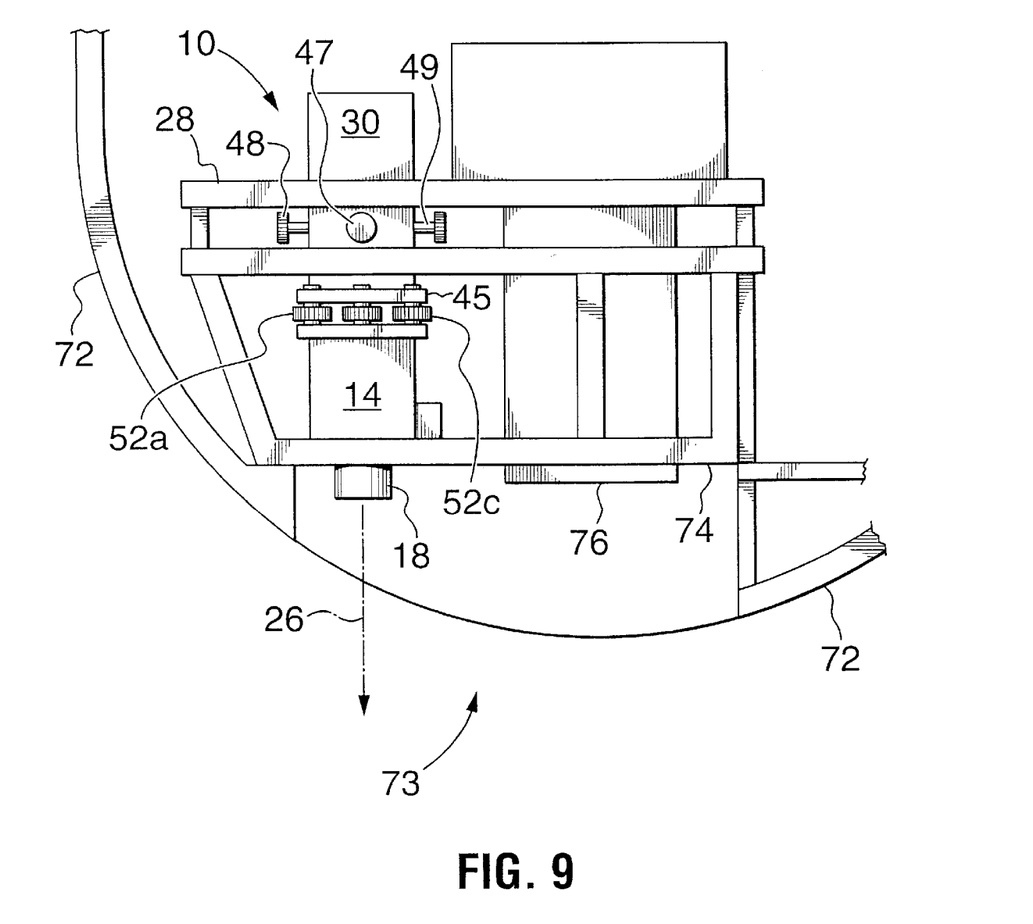
FIG. 9 is a sectioned plan view of a portion of an aerial reconnaissance vehicle or aircraft including a mounting frame in which the optical sensor mount apparatus of the present invention is incorporated.

FIG. 9 shows the camera mount apparatus of the present invention mounted in an aircraft 72 having an aperture 73 provided in the lower body thereof to allow the optical imaging equipment to image the terrain below the aircraft when in flight. The camera mount apparatus 10 is coupled to a mount structure 28 which is formed on or part of frame 74. In turn, frame 74 is securely coupled to the aircraft 72 by suitable means, such as bolting frame 74 to aircraft 72. Frame 74 preferably also provides a mount to support an optical source 76, for example, a laser optical source. Optical source 76 is used to illuminate the terrain passing below the aircraft when in flight. Optical axis 26 extends downwardly from aircraft 72 and has been oriented with respect to the aircraft by manipulation of the first and second pivot couplings 34 and 50 and X-Y translation apparatus 44, and yaw angle adjustment apparatus described previously with reference to FIGS. 1 through 5. The elements of the camera mount apparatus 10 which are visible in FIG. 6 bear the same reference numerals as was used in the other figures of the drawings.

Now that the invention has been disclosed, numerous substitutions, modifications and mechanical equivalents will occur to those skilled in the art which are within the scope of the invention as defined in the claims appended hereto.

What I claim is:

1. An optical image sensor mounting apparatus to mount an image sensor to a mount structure comprising:

(i) a frame to releasably retain an optical image sensor;

(ii) mount means for connection to a mount structure;

(iii) at least one pivot coupling interconnected with said frame and said mount means operable to set the angular displacement between said frame and said mount means; said pivot coupling comprising two substantially planar members threadingly interconnected by at least 3 spacedly disposed thumbscrews; wherein each said thumbscrew may be independently rotated to set the angular displacement between each said substantially planar member, and (iv) X-Y translation apparatus interconnected with said frame and said mount means operable to set the translational displacement between said frame and said mount means.

2. A mount apparatus as claimed in claim 1, wherein said thumbscrews are spacedly disposed at the vertices of an equilateral triangle.

3. A mount apparatus as claimed in claim 1, wherein said X-Y translation apparatus comprises a substantially planar member forming a central opening, two opposed pairs of threaded couplings extending upwardly from the plane of said planar member; each pair of threaded couplings orthogonally disposed about said central opening, each said threaded coupling forming a threaded bore to threadingly receive a threaded thumbscrew the axis of which extends toward its opposed pair threaded thumbscrew and parallel to the plane formed by said planar member, an X-Y translation coupling interposed between said threaded thumbscrews whereby the X-Y displacement between said X-Y translation coupling and said substantially planar member is operably controlled by said threaded thumbscrews.

4. A mount apparatus as claimed in claim 1, wherein said pivot coupling connects said mount means to said X-Y translation apparatus, and further including a second pivot coupling connecting said X-Y translation apparatus to said frame.

5. A mount apparatus as claimed in claim 1, further including at least one rotational coupling interconnected with said frame and said mount means operable to set the rotational displacement between said frame and said mount means.

6. A mount apparatus as claimed in claim 5, wherein one of said at least one rotational couplings comprises a first member defining two elongate substantially planar parallel surfaces, a second member forming an opening to rotatably receive said first member, two opposed pairs of thumbscrews threadingly engaging said second member spacedly disposed about said opening whereby one said opposed pair of thumbscrews bears upon each planar surface defined by said first member at one end and the other said opposed pair of thumbscrews bears upon each planar surface defined by said first member at the other end.

7. A mount apparatus as claimed in claim 1, further including a level indicator operable to indicate the level orientation of said frame.

8. An apparatus as claimed in claim 7, wherein said level indicator is a bubble level.

9. An optical image sensor mounting apparatus to mount an image sensor to a mount structure comprising:

(i) a frame to releasably retain an optical image sensor;

(ii) mount means for connection to a mount stricture;

(iii) at least one pivot coupling interconnected with said frame and said mount means operable to set the angular displacement between said frame and said mount means; said pivot coupling comprising two substantially planar members threadingly interconnected by at least 3 spacedly disposed thumbscrews; wherein each said thumbscrew may be independently rotated to set the angular displacement between each said substantially planar member, and (iv) at least one rotational coupling interconnected with said frame and said mount means operable to set the rotational displacement between said frame and said mount means;

(v) X-Y translation apparatus interconnected with said frame and said mount means operable to set the translational displacement between said frame and said mount means.

10. A mount apparatus as claimed in claim 9, wherein said thumbscrews are spacedly disposed at the vertices of an equilateral triangle.

11. A mount apparatus as claimed in claim 9, wherein said X-Y translation apparatus comprises a substantially planar member forming a central opening, two opposed pairs of threaded couplings extending upwardly from the plane of said planar member; each pair of threaded couplings orthogonally disposed about said central opening, each said threaded coupling forming a threaded bore to threadingly receive a threaded thumbscrew the axis of which extends toward its opposed pair threaded thumbscrew and parallel to the plane formed by said planar member, an X-Y translation coupling interposed between said threaded thumbscrews whereby the X-Y displacement between said X-Y translation coupling and said substantially planar member is operably controlled by said threaded thumbscrews.

12. A mount apparatus as claimed in claim 9, wherein said pivot coupling connects said mount means to said X-Y translation apparatus, and further including a second pivot coupling connecting said X-Y translation apparatus to said frame.

13. A mount apparatus as claimed in claim 9, wherein one of said at least one rotational couplings comprises a first member defining two elongate substantially planar parallel surfaces, a second member forming an opening to rotatably receive said first member, two opposed pairs of thumbscrews threadingly engaging said second member spacedly disposed about said opening whereby one said opposed pair of thumbscrews bears upon each planar surface defined by said first member at one end and the other said opposed pair of thumbscrews bears upon each planar surface defined by said first member at the other end.

14. A mount apparatus as claimed in claim 9, further including a level indicator operable to indicate the level orientation of said frame.

15. An apparatus as claimed in claim 14, wherein said level indicator is a bubble level.

16. An optical image sensor mounting apparatus to mount an image sensor to a mount structure comprising:

(i) a frame to releasably retain an optical image sensor;

(ii) mount means for connection to a mount structure;

(iii) a first pivot coupling interconnecting an intermediate member to said mount means operable to set the angular displacement between said intermediate member and said mount means;

(iv) a second pivot coupling interconnecting said intermediate member to said frame operable to set the angular displacement between said intermediate member and said frame;

(v) at least one rotational coupling interconnected with said frame and said mount means operable to set the rotational displacement between said frame and said mount means;

and (vi) X-Y translation apparatus interconnected with said frame and said mount means operable to set the translational displacement between said frame and said mount means.

17. A mount apparatus as claimed in claim 16 wherein each said first and second pivot couplings comprises two substantially planar members threadingly interconnected by at least 3 spacedly disposed thumbscrews; wherein each said thumbscrew may be independently rotated to set the angular displacement between each said substantially planar member.

18. A mount apparatus as claimed in claim 17 wherein said thumbscrews are spacedly disposed at the vertices of an equilateral triangle.

19. A mount apparatus as claimed in claim 17 wherein 4 said thumbscrews are provided spacedly disposed at the vertices of a rectangle triangle.

20. A mount apparatus as claimed in claim 16 wherein said X-Y translation apparatus comprises a substantially planar member forming a central opening, two opposed pairs of threaded couplings extending upwardly from the plane of said planar member; each pair of threaded couplings orthogonally disposed about said central opening, each said threaded coupling forming a threaded bore to threadingly receive a threaded thumbscrew the axis of which extends toward its opposed pair threaded thumbscrew and parallel to the plane formed by said planar member, an X-Y translation coupling interposed between said threaded thumbscrews whereby the X-Y displacement between said X-Y translation coupling and said substantially planar member is operably controlled by said threaded thumbscrews.

21. A mount apparatus as claimed in claim 16, wherein said first pivot coupling connects said mount means to said X-Y translation apparatus, and said second pivot coupling connecting said X-Y translation apparatus to said frame.

22. A mount apparatus as claimed in claim 16 wherein one of said at least one rotational couplings comprises a first member defining two elongate substantially planar parallel surfaces, a second member forming an opening to rotatably receive said first member, two opposed pairs of thumbscrews threadingly engaging said second member spacedly disposed about said opening whereby one said opposed pair of thumbscrews bears upon each planar surface defined by said first member at one end and the other said opposed pair of thumbscrews bears upon each planar surface defined by said first member at the other end.

23. A mount apparatus as claimed in claim 16 further including a level indicator operable to indicate the level orientation of said frame.

24. A mount apparatus as claimed in claim 23 wherein said level indicator is a bubble level.

* * * * *